United States Patent [19]

Sanderson et al.

[11] Patent Number: 4,972,672
[45] Date of Patent: Nov. 27, 1990

[54] CONTROLLED BYPASS INLET DUCT

[75] Inventors: John J. Sanderson, Oakville; Ivor Banks, Georgetown, both of Canada

[73] Assignee: Pratt & Whitney Canada, Inc., Longueuil, Canada

[21] Appl. No.: 413,660

[22] Filed: Sep. 28, 1989

[51] Int. Cl.[5] .................................... F02C 7/052
[52] U.S. Cl. ........................ 60/39.092; 55/306
[58] Field of Search ............... 60/39.092; 244/53 B; 55/306; 415/121.2

[56] References Cited

U.S. PATENT DOCUMENTS

| | | |
|---|---|---|
| 2,381,705 | 8/1945 | Vokes . |
| 2,407,194 | 9/1946 | Vokes . |
| 3,137,129 | 6/1964 | Donohue et al. . |
| 3,329,337 | 7/1967 | Peterson et al. . |
| 3,338,049 | 8/1967 | Fernberger . |
| 3,347,496 | 10/1967 | Opfer, Jr. . |
| 3,362,155 | 1/1968 | Driscoll ............... 60/39.092 |
| 3,766,719 | 10/1973 | McAnally ............. 60/39.092 |
| 3,952,972 | 4/1976 | Tedstone et al. ..... 60/39.092 |
| 4,250,703 | 2/1981 | Norris et al. . |
| 4,268,284 | 5/1981 | Kent et al. . |
| 4,346,860 | 8/1982 | Tedstone . |
| 4,397,431 | 8/1983 | Ben-Porat . |
| 4,425,756 | 1/1984 | Ballard et al. . |
| 4,456,458 | 6/1984 | Gilbertson ........... 60/39.092 |

Primary Examiner—Louis J. Casaregola
Attorney, Agent, or Firm—Troxell K. Snyder

[57] ABSTRACT

A separating inlet duct (14) is provided with a reduced arm, bypass throat section (46) to restrict the bypass flow (18b) during periods of high speed aircraft flight. An ejector (34) ensures a minimum bypass flow (18b) during hover or low speed flight. An icing resistance baffle (40) having a rounded leading edge (42) defines the sized throat section (46).

5 Claims, 2 Drawing Sheets

CONTROLLED BYPASS INLET DUCT

FIELD OF THE INVENTION

The present invention relates to a nice and liquid separating inlet duct for a gas turbine engine or the like.

BACKGROUND

Inertial separating inlets for gas turbine engines for preventing the ingestion of supercooled water, ice, snow and other debris into an aircraft engine are well known. In such installations, a duct is typically located adjacent the nacelle containing the engine and extends generally longitudinally of the engine. The duct includes an air admitting opening at the upstream end and a bypass discharge opening at the downstream end.

Air enters the engine nacelle via an opening in the duct wall with the engine air forced to make a relatively sharp turn prior to exiting the duct. The portion of the admitted air passing downstream and exiting the bypass opening carries the liquid, ice or other debris which has been separated from the engine air by inertial forces.

As is well known to those skilled in the art, an increased ratio of bypassed air to engine air results in an increased overall momentum drag for the engine nacelle-duct structure. It is therefore desirable to reduce the bypass ratio of the separating duct especially during periods of high speed aircraft operation.

One important consideration with regard to the modification of the bypass flow ratio of the separating duct is the potential for ice formation within the duct on any flow deflecting or other surfaces present therein. Such interior ice formation may restrict or alter the function of the separating duct, and thereby adversely affect engine performance or reliability.

It is common in fixed wing aircraft applications to use the air pressure rise resulting from aircraft speed to drive the flow through the separating duct for protecting the engine. Such an arrangement is ineffective in rotating wing aircraft which frequently require protection during hover, climbout, etc. Such rotating wing aircraft require a flow inducer or other means in the duct to ensure a continuing flow of bypass air in order to achieve debris separation during hover as well as to prevent flow reversal in the bypass discharge opening during low speed flight.

The requirement for a flow inducer for hover and low speed operation in rotating wing applications leads to an increased bypass flow ratio at relatively high rotor craft speeds and hence an increased aerodynamic drag during such operation.

SUMMARY OF THE INVENTION

It is therefore an object of the present invention to provide a reduced loss inertial separation inlet for a gas turbine engine.

According to the present invention, an inlet duct for receiving and directing a flow of air to a gas turbine engine is provided with an upstream facing inlet opening, an opening in the duct wall for admitting a portion of the duct air flow to the engine, and a baffle to restrict the bypass flow at relatively high rotor craft speeds by defining a reduced throat bypass flow area. The baffle is located downstream of the inlet and includes a rounded leading edge and downstream extending portion secured to the duct wall.

The baffle restricts the bypass air flow as aircraft velocity increases, but is position positioned so as not to interfere or restrict airflow at relatively low aircraft velocity.

By restricting the bypass airflow only during periods of relatively high aircraft velocity, the inlet duct according to the present invention increases overall aerodynamic efficiency by reducing the drag component resulting from excess bypass flow. The rounded edge and the recirculation zone of the inlet duct configuration accommodates any ice shed by the upstream duct structure, thus maintaining safe and efficient engine operation.

Both these and other objects and advantages of the inlet arrangement according to the present invention will be apparent upon review of the following specification and the appended claims and drawing figures.

DETAILED DESCRIPTION

Figure 1:
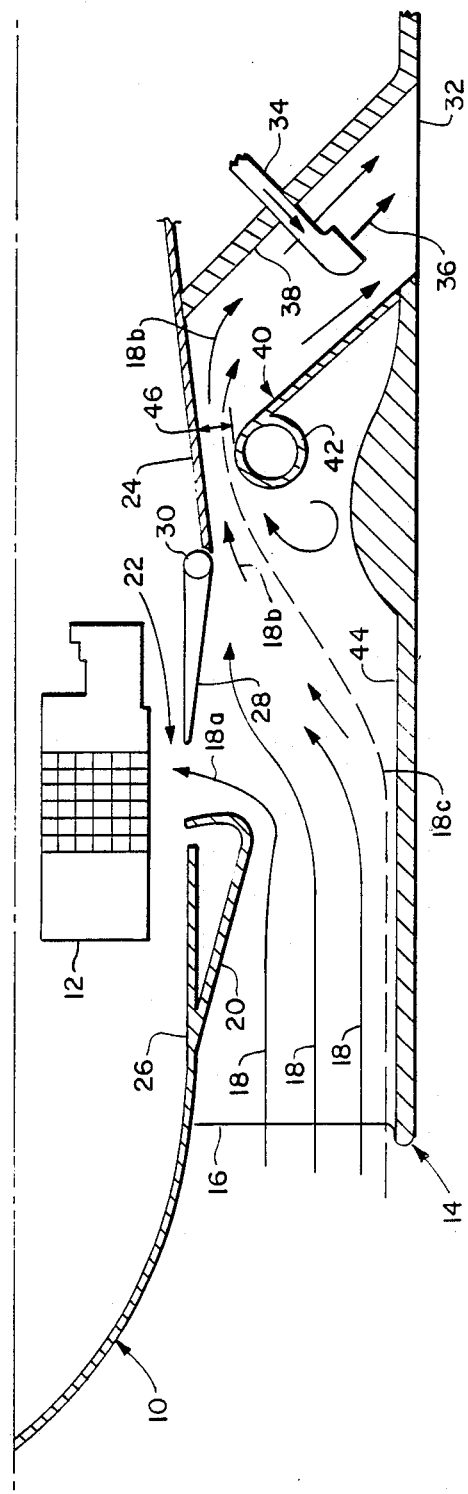
FIG. 1 shows a cutaway view of a gas turbine engine nacelle and bypass duct according to the present invention.

FIG. 1 shows a schematic cross section of an engine nacelle 10 enclosing a turbo shaft gas turbine engine 12. An inlet duct 14 is disposed adjacent the nacelle 10 and runs longitudinally with respect to the engine 12. The duct 14 includes a forward facing inlet opening 16 for receiving a flow of ambient air 18 which is routed to the gas turbine engine 12 as discussed below. The inlet duct 14 may be located directly below the engine 12 as for a fixed wing aircraft engine installation or laterally as, for example, in a helicopter installation.

The duct 14 as shown in FIG. 1 is configured to achieve maximum inertial separation of solids or liquids entrained in the entering airflow 18. As will be apparent from FIG. 1 and as known to those skilled in the art, such separating inlets require a portion of the entering air 18 to negotiate a substantially right angle curve prior to passing out of the inlet duct 14 via a lateral intake opening 22 disposed in the wall 24 dividing the inlet duct 14 from the engine nacelle 10.

The internal configuration of the duct 14 is controlled, in part, by a first upstream vane 20 which is fixed or hingedly mounted to 26 at the upstream or leading edge thereof and a second, downstream vane 28 which is also hinged at the trailing edge 30 thereof. The portion 18a of the entering air 18 which enters the engine 12 must negotiate a substantially right angle turn prior to exiting the duct 14 via the intake opening 22. Heavier matter entrained in the air 18 is unable to negotiate this right angle turn and remains entrained in a bypass portion 18b of the entering air 18 which continues to flow aftward through the duct 14 eventually exiting the duct through a downstream outlet opening 32.

For certain installations, in particular for rotating wing craft, such as helicopters and the like, it is necessary to provide means for inducing bypass airflow during hover and low speed operation in a dusty or icing environment. One method for providing such induction is by the use of an exhaust ejector 34 by which a quantity of exhaust gas 36 is exhausted into the downstream portion 38 of the duct 14 thereby ensuring at least a minimum flow of bypass air 18b in order to maintain separation of solids, liquids, etc. within the duct 14.

The present invention provides for a forward sloping baffle 40 including a rounded leading edge 42 which extends from the opposite or outside duct wall 44 toward the inner dividing wall 24, creating a sized flow area throat section 46 for restricting the flow of bypass air 18b at increased inlet flow velocities.

Figure 2:
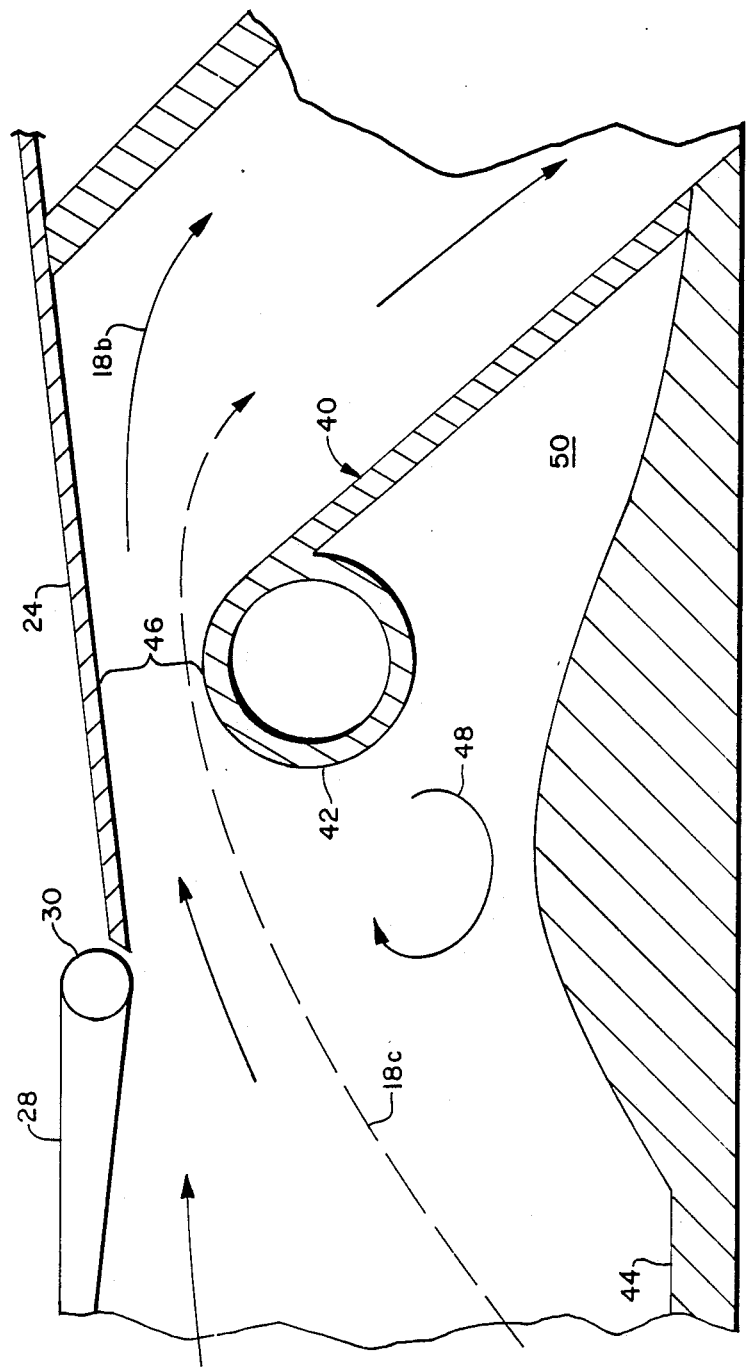
FIG. 2 shows an enlarged detail cutaway of the flow restricting baffle according to the present invention.

FIG. 2 shows an expanded view of the baffle 40 and the associated duct structure. The baffle 40 is located downstream of the lateral intake opening 22 (not shown in FIG. 2) and includes a substantially cylindrical leading edge 42 extending across the duct 14 and being spaced from the inner duct wall 24. The throat 46 is sized in response to the minimum bypass flow rate required and achieved by the duct 14 under hover and reverse flight operating conditions. It has been found through experimentation that the air flowing within the duct 14 at minimum flow follows the route substantially outlined by the broken line 18c shown in FIGS. 1 and 2.

During minimum bypass flow ratio, air 18 is drawn into the nacelle opening 16, and flows aftward, being separated into a first portion 18a exiting the duct 14 via the intake opening 22, and a second bypass portion 18b which flows aftward adjacent the inner duct wall 24 eventually flowing overboard through outlet opening 32. A benign recirculation zone 48 is established outboard of the bypass flow 18b.

It is a particular feature of the inlet according to the present invention to locate the forwardly inclined baffle 40 so as not to interfere with the minimum bypass flow as discussed above. During periods of elevated aircraft velocity wherein the air 18 entering the duct opening 16 is at relatively high velocity, the baffle 40 restricts the flow of air 18b maintaining a relatively low bypass ratio and reducing overall duct drag loss. The sized or controlled area throat prevents bypass flow from increasing to unnecessarily high rates while the upstream duct configuration continues to separate supercooled water, ice, or other particulate matter from the engine air 18a provided to the engine 12.

The shape of the baffle 40 is particularly important to the overall performance of the duct 14 according to the present invention and in particular to the prevention of icing on the leading edge 42 as well as with regard to the ability of the baffle 40 to withstand and accommodate ice chunks (not shown) which may form and separate from the upstream portions of the duct and/or aircraft. The leading edge 42 of the baffle 40 is semicylindrical for presenting a blunted surface to the local airflow. The diameter of the leading edge 42 is selected based on local flow and icing conditions so as to resist icing yet remain strong enough to withstand impact of ice chunks shed into the entering airstream. A diameter of 2 inches has been found suitable for most applications.

Likewise, the provision of a blind or dead end volume 50 between the aftward portion of the baffle 40 and the outside duct wall 44 allows the baffle 40 to collect ice chunks or other debris that may separate from the bypass stream 18b. Volume 50 is sized to accommodate the likely accumulation of ice during an adverse aircraft mission or flight and may further be provided with drain holes or vents (not shown) to allow the melted ice to flow from the volume 50 when the aircraft enters a relatively warm environment.

The use of the forward facing inclined baffle 40 and semicylindrical leading edge 42 is particularly advantageous in avoiding the buildup of ice and the potential for blocking the throat 46 as might be caused by merely decreasing the downstream duct cross section by moving the outer wall 44 closer to the inner duct wall 24 as is taught in the prior art. Such gradual decrease in the duct wall spacing would inevitably result in icing buildup and attachment of ice shed from upstream surfaces to the outer wall 44, eventually closing or otherwise reducing the effectiveness of the duct 14.

The invention thus provides an effective, and safe means for maintaining a duct bypass ratio in the range of 10 to 40% over the entire operating range of the duct 14. The invention is particularly well adapted to helicopter installations wherein a controlled bypass flow is required and wherein the minimum flow ratio is achieved at relatively low aircraft speeds.

It is yet another feature of the duct 14 according to the present invention to provide increased resistance to backflow such as may result during helicopter hovering in a tail wind or other external flow. The reduced throat section 24 in cooperation with the flow inducing ejector 34 assures a continual bypass flow 18b and hence prevents flow reversal upstream of the bypass duct throat.

It will further be appreciated that although shown and illustrated by the above description and drawing figures, the duct according to the present invention may assume a variety of cross sectional configurations equally within scope of the invention which is limited only by the claims appended herein below.

We claim:
1. An inlet duct for a gas turbine engine, comprising:
   a first duct wall extending generally longitudinally with respect to the engine;
   a second duct wall, spaced laterally from the first wall and extending generally longitudinally with respect to the engine, the first and second duct walls collectively defining an airflow path between an upstream facing inlet opening and a downstream discharge opening;
   an intake opening, disposed in the first duct wall, for diverting a first portion of the duct airflow to the gas turbine engine;
   a baffle, disposed within the duct downstream of the intake opening, said baffle secured, at a downstream edge thereof, to the second duct wall and extending both laterally and upstream to a rounded leading edge spaced apart from the first duct wall, the first duct wall and the baffle leading edge defining a sized throat section therebetween, and;
   means disposed downstream of the throat, for inducing a second, bypass portion of the duct airflow through the throat and out the discharge opening.

2. The duct as recited in claim 1, wherein the baffle and second duct wall define an upstream facing recirculation zone therebetween.

3. The duct as recited in claim 1, wherein the flow inducing means includes:
   an ejector receiving a flow of exhaust gas from the gas turbine engine.

4. The duct as recited in claim 1, wherein the flow area of the throat section is sized responsive to a minimum bypass portion airflow rate.

5. The duct as recited in claim 1, wherein the leading edge is semicylindrical and has a diameter of approximately 2 inches.

* * * * *